US006638169B2

(12) United States Patent

Wilder et al.

(10) Patent No.: US 6,638,169 B2

(45) Date of Patent: Oct. 28, 2003

(54) GAMING MACHINES WITH DIRECTED SOUND

(75) Inventors: Richard L. Wilder, Sparks, NV (US); William R. Wells, Reno, NV (US); Harold Mattice, Gardnerville, NV (US); Chauncey W. Griswold, Reno, NV (US)

(73) Assignee: IGT, Reno, NV (US)

(*) Notice: Subject to any disclaimer, the term of this patent is extended or adjusted under 35 U.S.C. 154(b) by 141 days.

(21) Appl. No.: 09/966,860

(22) Filed: Sep. 28, 2001

(65) Prior Publication Data

US 2003/0064804 A1 Apr. 3, 2003

(51) Int. Cl.[7] .......... A63F 13/02

(52) U.S. Cl. .......... 463/35; 463/47

(58) Field of Search .......... 463/35, 47; 381/382; 273/148 B

(56) References Cited

U.S. PATENT DOCUMENTS 5,027,102 A * 6/1991 Sweeny .......... 340/323 R 5,661,699 A * 8/1997 Sutton .......... 367/132

6,016,351 A * 1/2000 Raida et al. .......... 381/77

6,530,835 B1 * 3/2003 Walker et al. .......... 463/25

* cited by examiner

*Primary Examiner*—Jessica Harrison

*Assistant Examiner*—Yveste Cherubin

(74) *Attorney, Agent, or Firm*—Marshall, Gerstein & Borun LLP

(57) ABSTRACT

A casino gaming apparatus is disclosed which includes a controller programmed to generate an audio signal. The controller is operatively linked to an ultrasonic audio processor. The ultrasonic audio processor is programmed to convert the audio signal received from the controller into an ultrasonic signal. The ultrasonic audio processor is operatively linked to an ultrasonic emitter which emits the ultrasonic signal along a column of air in front of the gaming apparatus. The ultrasonic signal is demodulated into audible sounds along the column by interaction of the ultrasonic signal with air to produce audible sound substantially confined within the column. The column intersects the position where the player stands or sits. Accordingly, sounds are generated by the gaming apparatus are confined to an area occupied by the player and provide little or no distractions for players using adjacent gaming apparatuses.

29 Claims, 14 Drawing Sheets

GAMING MACHINES WITH DIRECTED SOUND

BACKGROUND OF THE INVENTION

The invention relates generally to gaming machines and, more specifically, gaming machines with sound systems capable of generating directed sound so as to reduce or eliminate distractions to other players operating other machines in an adjoining area.

Casinos are crowded, noisy environments. The noise level in a casino is often disturbing to the players. One area of a casino that is particularly problematic is the gaming machine area where gaming machines such as, for example, slot machines are closely spaced together.

Specifically, modern gaming machines generate large amounts of noise. Audible sounds are generated by the machines to attract players, provide audible instructions to players and to inform players of the outcome of the game being played. Additional audible sounds may also be used to generate excitement or suspense during the playing of a game. Finally, audible sounds may also be used by modern, computerized machines to simulate the sounds of mechanical slot machines which have largely been replaced by video slot machines.

While the use of audible sounds is an important facet of modern gaming machines, the large amounts of noise generated in the gaming machine area of a casino can be very distractive to the player. The large amounts of background noise can also be particularly irritating to players wearing hearing aids.

Thus, there is a need for a gaming machine which can generate audible sounds that are beneficial to the player and which add to the appeal of the game being played but which are also limited so as to reduce the level of distraction to other players in the immediate vicinity.

SUMMARY OF THE INVENTION

In one aspect, the invention is directed to a gaming apparatus that may comprise a controller programmed to generate an audio signal. The controller is operatively linked to an ultrasonic audio processor. The ultrasonic audio processor is programmed to convert the audio signal received from the controller into an ultrasonic signal. The ultrasonic audio processor is operatively linked to an ultrasonic emitter. The ultrasonic emitter emits the ultrasonic signal received from the ultrasonic audio processor along a column of air in the front of the gaming apparatus. Interaction of the ultrasonic signal with the air results in a demodulation of the ultrasonic signal into audible sounds which are at least substantially confined to the column or air in front of the gaming apparatus. In this manner, the audio signals of the gaming apparatus are confined to a column of air or space disposed in front of the gaming apparatus. The emission of an ultrasonic signal and subsequent demodulation thereof results in audio sounds that are directed through the space which is occupied by the player. The only audible sounds generated by the gaming apparatus which can be heard in the immediate vicinity of the gaming apparatus are those audible sounds which are reflected, either off of the user or off of a surface which is struck by the audible sound waves.

Preferably, the column of air through which the ultrasonic signal is directed and demodulated is a vertical column. Because gaming apparatuses are typically placed on carpeted floors, which serve as poor sound reflectors and good sound absorbers, and further because a player's body and clothing are also poor sound reflectors and good sound absorbers, the majority of the audible sound waves generated by a gaming apparatus made in accordance with the present invention are not reflected to the adjoining areas and therefore do not cause distractions to other players playing nearby gaming apparatuses.

Accordingly, because it is preferred, but not required, to transmit the ultrasonic signal through a vertical column, preferred locations for mounting the ultrasonic emitter include the top of the gaming apparatus, a top portion of the front of the gaming apparatus or mounted to a wall or ceiling above the gaming apparatus so that the ultrasonic signal can be emitted downward towards the player or through a space normally occupied by the player. Another embodiment would include mounting the emitter on a lower portion of the gaming apparatus and having the ultrasonic signal emitted upward towards the user.

The invention is also directed to a gaming apparatus that may comprises a display unit that is capable of generating video images, a value input device and an ultrasonic processor programmed to convert audible signals into ultrasonic signals. The ultrasonic audio processor is operatively linked to an ultrasonic emitter. The ultrasonic emitter is capable of emitting ultrasonic signals within a column of air in front of the gaming apparatus. The ultrasonic signals are demodulated into audible sounds within the column by interaction of the ultrasonic signals with the air. A controller is operatively coupled to the display unit, the value input device and the ultrasonic audio processor. The controller is programmed to allow a person to make a wager and a payline selection. The controller is also programmed to cause a video image to be generated on the display unit and to send an audio signal to the ultrasonic audio processor. The video image and audio signal may represent a game selected from the group of games consisting of video poker, video blackjack, video slots, video keno and video bingo. The controller is programmed to determine the outcome of the game represented by the audio signal and the video image and a value payout associated with the outcome of the game.

In another aspect, the invention is directed toward a gaming method which comprises causing a video game image and an audio signal to be generated. The video game image and the audio signal represent a game selected from the group consisting of video poker, video blackjack, video slots, video keno and video bingo. The audio signal comprises game instructions and an indication of the outcome of the game. The video game image comprises an image of at least five playing cards if the game is video poker, simulated slot machine reels if the game is video slots, a plurality of playing cards if the game is video blackjack, a plurality of keno numbers if the game is video keno and an image of a bingo grid if the game is video bingo. The method further comprises determining an outcome of the game represented by the video game images, determining a payout associated with the outcome of the game, converting the audio signal to an ultrasonic signal, emitting the ultrasonic signal along a column of air in front of the video image, i.e., where the player would stand, and demodulating the ultrasonic signal in the column with the air to produce audible sounds for the player that are confined or substantially confined within the column.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

Figure 1:
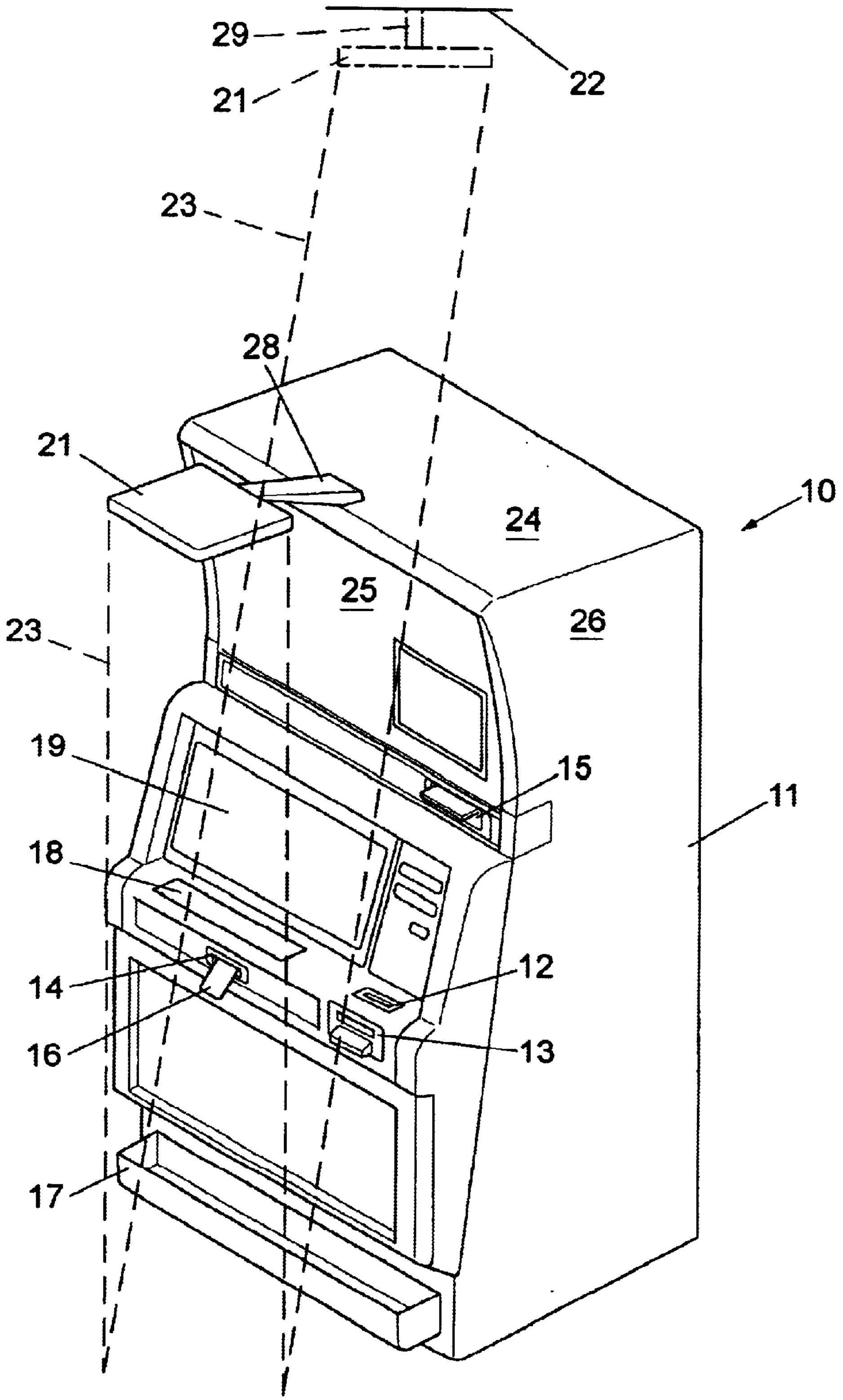
FIG. 1 is a perspective view of an embodiment of a gaming unit in accordance with the present invention.

FIG. 1 is a perspective view of a gaming machine 10 made in accordance with the present invention. Although the following description addresses the design of the gaming unit 10, it should be understood that various designs for the gaming unit 10 can be utilized with the novel aspects of the present invention.

Referring to FIG. 1, the casino gaming unit 10 may include a housing or cabinet 11 and one or more input devices, which may include a coin slot or acceptor 12, a paper currency acceptor 13, a ticket reader/printer 14 and a card reader 15, which may be used to input value to the gaming unit 10. A value input device may include any device that can accept value from a customer. As used herein, the term "value" may encompass gaming tokens, coins, paper currency, ticket vouchers, credit or debit cards, and any other object representative of value.

If provided on the gaming unit 10, the ticket reader/printer 14 may be used to read and/or print or otherwise encode ticket vouchers 16. The ticket vouchers 16 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 16 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 16 could be printed with an optically readable material such as ink, or data on the ticket vouchers 16 could be magnetically encoded. The ticket reader/printer 14 may be provided with the ability to both read and print ticket vouchers 16, or it may be provided with the ability to only read or only print or encode ticket vouchers 16. In the latter case, for example, some of the gaming units 10 may have ticket printers 14 that may be used to print ticket vouchers 16, which could then be used by a player in other gaming units 10 that have ticket readers 16.

If provided, the card reader 15 may include any type of card reading device, such as a magnetic card reader or an optical card reader, and may be used to read data from a card offered by a player, such as a credit card or a player tracking card. If provided for player tracking purposes, the card reader 15 may be used to read data from, and/or write data to, player tracking cards that are capable of storing data representing the identity of a player, the identity of a casino, the player's gaming habits, etc.

The gaming unit 10 may also include a coin payout tray 17, an input control panel 18, and a color video display unit 19 for displaying images relating to the game or games provided by the gaming unit 10. The input control panel 18 may be provided with a plurality of pushbuttons or touch-sensitive areas that may be pressed by a player to select games, make wagers, make gaming decisions 42, 42*a*, etc.

The gaming unit 10 includes an ultrasonic emitter 21 that can either be mounted to the gaming unit 10 as shown in FIG. 1 or mounted to a ceiling or wall 22 as shown in phantom in FIG. 1. The use of ultrasonic emitters 21 is intended either to replace or supplement the use of conventional audio speakers (not shown). The advantage of using the ultrasonic emitters 21 as opposed to audio speakers is to reduce the distraction caused by audible sounds from the gaming unit 10 to other players of other gaming units in the immediate vicinity. Specifically, the ultrasonic emitters 21 emit ultrasonic signals within a defined column such as those shown in phantom at 23 in FIG. 1. The defined column of space passes through the area where the player would stand to play the gaming unit 10. The ultrasonic signal emitted by the one or more ultrasonic emitters 21 is demodulated by interaction of the ultrasonic waves with air in the columns 23. The demodulation of the ultrasonic signals converts the ultrasonic signals into audible sounds which the player (not shown) can hear. However, instead of the audible sounds being widely scattered about the area surrounding the gaming unit 10, the audible sounds are substantially confined to the columns 23. The only sound that escapes the columns 23 are those audible sound waves that are reflected off of the floor (not shown), the gaming unit 10 or the player's body (not shown).

Because an effective reflection of sound waves requires a substantially flat, non-porous planar surface, reflection off of the player or off of carpeted floor is minimal. In this way, the audible sounds generated by the gaming unit 10, by way of the emission of an ultrasonic signal by the one or more emitters 21 is substantially confined to the column or columns shown at 23 in FIG. 1. As a result, distraction to other players in the adjoining area by the audible sounds generated by the gaming unit 10 is minimized.

Figure 2:
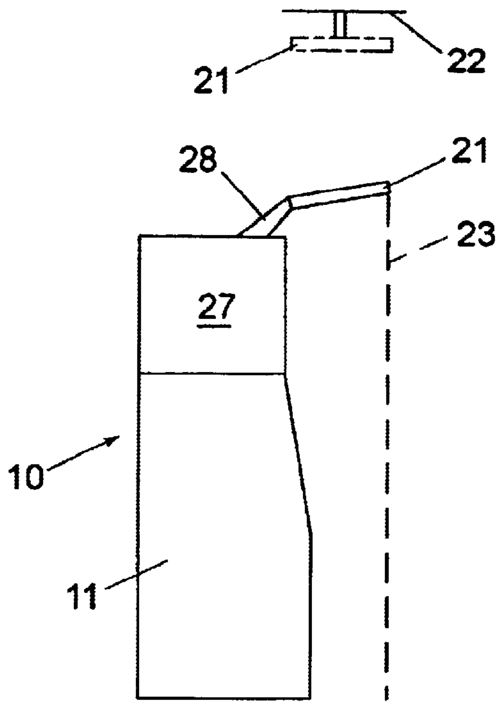
FIG. 2 is a side plan view of the gaming unit shown in FIG. 1.
Figure 3:
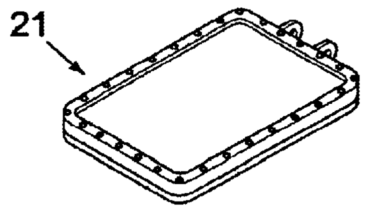
FIG. 3 is a perspective view of an ultrasonic emitter of the gaming unit shown in FIGS. 1 and 2.

It will be noted that one ultrasonic emitter 21 is sufficient. However, a plurality of ultrasonic emitters 21 may be utilized. The ultrasonic emitters 21 may be mounted to the top surface 24, a front surface 25 or one of the side surfaces 26, 27 (see FIG. 2) of the gaming unit 10. Also, as shown in FIG. 1, the two emitters 21 illustrated are mounted above the player. It will also be noted that an emitter 21 could be mounted below a player and directed upward. A common bracket 28 or 29 can be used for purposes of mounting the emitter 21. A perspective view an emitter 21 is shown in FIG. 3. Such ultrasonic emitters are sold under the trademark HYPERSONIC™ by American Technology Corporation of San Diego, Calif.

Figure 6:
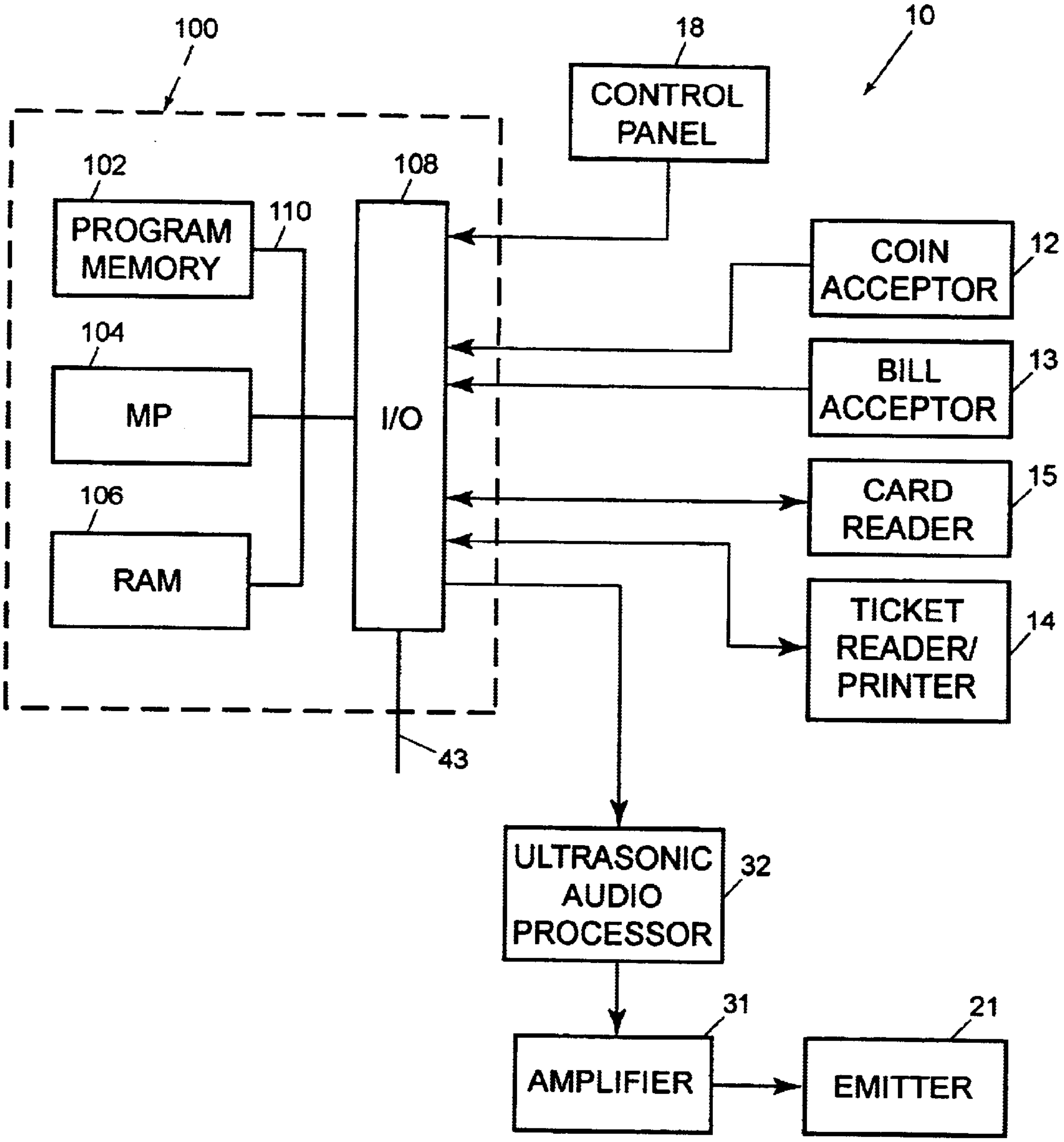
FIG. 6 is a block diagram of the electronic components of the gaming unit of FIGS. 1 and 2.

Turning briefly to FIG. 6, the emitter 21 is operatively linked to an amplifier 31 which, in turn, is operatively linked to an ultrasonic audio processor 32. The ultrasonic processor 32 receives an audio signal from the controller 100, converts that audio signal into an ultrasonic signal which is then amplified at the amplifier 31 and emitted by the emitter 21. Details of the operation of the emitter 21 can be found in U.S. Pat. No. 6,016,351.

The emitters 21 are relatively small, with current sizes having a width of about 10 inches and anticipated smaller embodiments having a width as small as 5 inches. The width of the resulting column 23 of audible sound transmission can vary from less than one foot to about four feet or more. Preferably, the column 23 has a width of less than or about four feet. The length of the column 23 of transmission can be varied by way of the amplifier 31.

Figure 4:
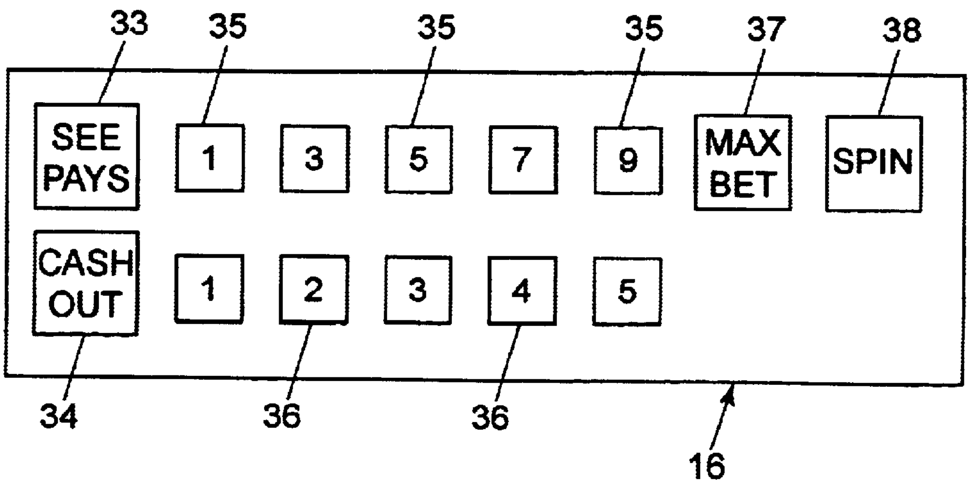
FIG. 4 illustrates an embodiment of a control panel for the gaming unit shown in FIGS. 1 and 2.

FIG. 4 illustrates one possible embodiment of the control panel 18, which may be used where the gaming unit 10 is a slot machine having a plurality of mechanical or "virtual" reels. Referring to FIG. 4, the control panel 18 may include a "See Pays" button 33 that, when activated, causes the display unit 19 to generate one or more display screens showing the odds or payout information for the game or games provided by the gaming unit 10. As used herein, the term "button" is intended to encompass any device that allows a player to make an input, such as an input device that must be depressed to make an input selection or a display area that a player may simply touch. The control panel 18 may include a "Cash Out" button 34 that may be activated when a player decides to terminate play on the gaming unit 10, in which case the gaming unit 10 may return value to the player, such as by returning a number of coins to the player via the payout tray 17.

If the gaming unit 10 provides a slots game having a plurality of reels and a plurality of paylines which define winning combinations of reel symbols, the control panel 18 may be provided with a plurality of selection buttons 35, each of which allows the player to select a different number of paylines prior to spinning the reels. For example, five buttons 35 may be provided, each of which may allow a player to select one, three, five, seven or nine paylines.

If the gaming unit 10 provides a slots game having a plurality of reels, the control panel 18 may be provided with a plurality of selection buttons 36 each of which allows a player to specify a wager amount for each payline selected. For example, if the smallest wager accepted by the gaming unit 10 is a quarter ($0.25), the gaming unit 10 may be provided with five selection buttons 36, each of which may allow a player to select one, two, three, four or five quarters to wager for each payline selected. In that case, if a player were to activate the "5" button 35 (meaning that five paylines were to be played on the next spin of the reels) and then activate the "3" button 36 (meaning that three coins per payline were to be wagered), the total wager would be $3.75 (assuming the minimum bet was $0.25).

The control panel 18 may include a "Max Bet" button 37 to allow a player to make the maximum wager allowable for a game. In the above example, where up to nine paylines were provided and up to five quarters could be wagered for each payline selected, the maximum wager would be forty-five quarters, or $11.25. The control panel 18 may include a spin button 38 to allow the player to initiate spinning of the reels of a slots game after a wager has been made.

In FIG. 4, a rectangle is shown around the buttons 33–38. It should be understood that rectangle simply designates, for ease of reference, an area in which the buttons 33–38 may be located. Consequently, the term "control panel" should not be construed to imply that a panel or plate separate from the housing 11 of the gaming unit 10 is required, and the term "control panel" may encompass a plurality or grouping of player activatable buttons.

Although one possible control panel 18 is described above, it should be understood that different buttons could be utilized in the control panel 18, and that the particular buttons used may depend on the game or games that could be played on the gaming unit 10. Although the control panel 18 is shown to be separate from the display unit 19, it should be understood that the control panel 18 could be generated by the display unit 19. In that case, each of the buttons of the control panel 18 could be a colored area generated by the display unit 19, and some type of mechanism may be associated with the display unit 19 to detect when each of the buttons was touched, such as a touch-sensitive screen.

Figure 5:
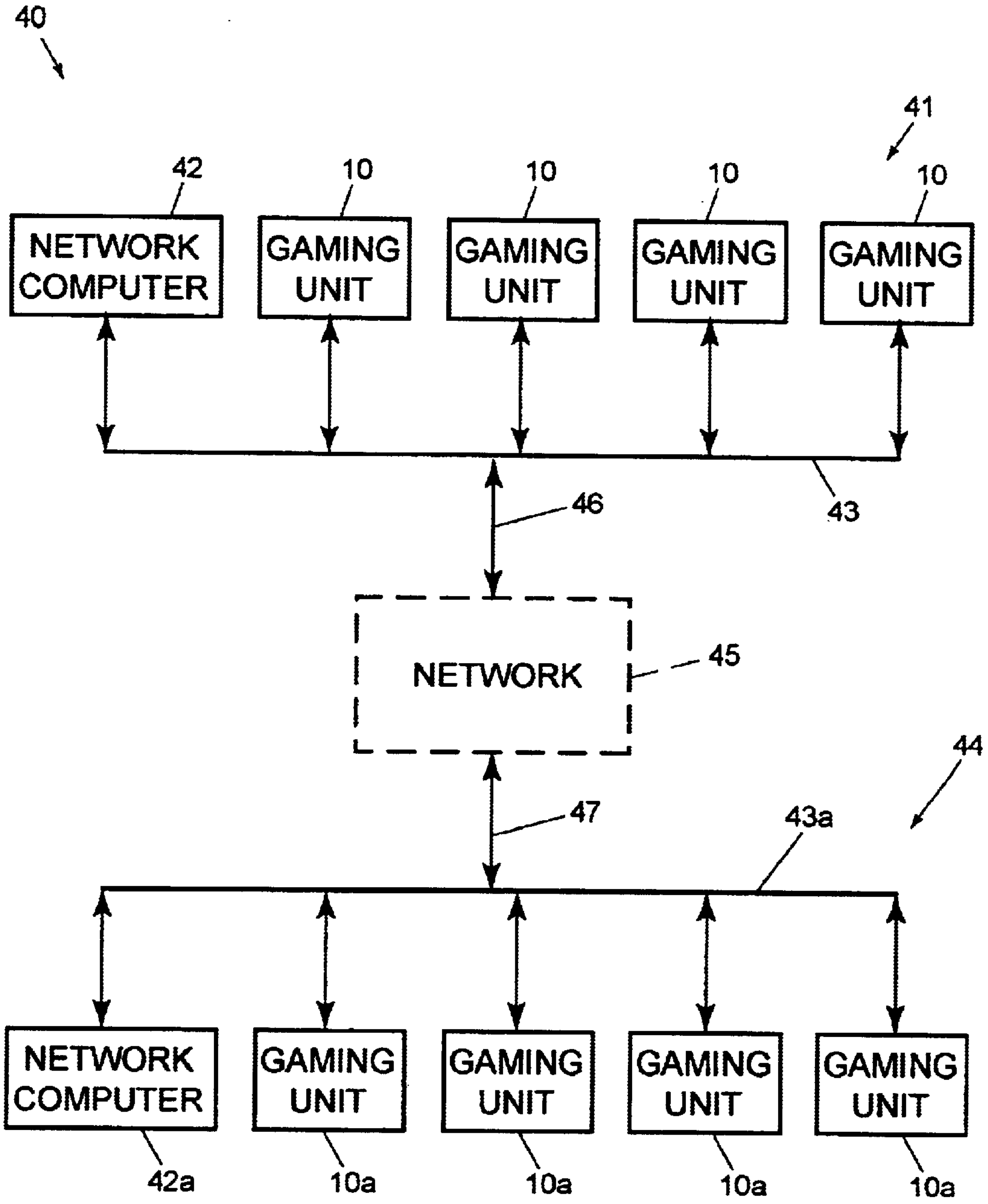
FIG. 5 is a block diagram of an embodiment of a gaming system in accordance with the invention.

FIG. 5 illustrates an embodiment of a gaming system 40 in accordance with the invention. Referring to FIG. 5, the gaming system 40 may include a first group or network 41 of gaming units 10 operatively coupled to a network computer 42 via a network data link or bus 43. The gaming system 40 may include a second group or network 44 of gaming units 10*a* operatively coupled to a network computer 42*a* via a network data link or bus 43*a*. The first and second gaming networks 41, 44 may be operatively coupled to each other via a network 45, which may comprise, for example, the Internet, a wide area network (WAN), or a local area network (LAN) via a first network link 46 and a second network link 47.

The first network 41 of gaming units 10 may be provided in a first casino, and the second network 44 of gaming units 10*a* may be provided in a second casino located in a separate geographic location than the first casino. For example, the two casinos may be located in different areas of the same city, or they may be located in different states. The network 45 may include a plurality of network computers or server computers (not shown), each of which may be operatively interconnected. Where the network 45 comprises the Internet, data communication may take place over the communication links 46, 47 via an Internet communication protocol.

The network computer 42 may be a server computer and may be used to accumulate and analyze data relating to the operation of the gaming units 10. For example, the network computer 42 may continuously receive data from each of the gaming units 10 indicative of the dollar amount and number of wagers being made on each of the gaming units 10, data indicative of how much each of the gaming units 10 is paying out in winnings, data regarding the identity and gaming habits of players playing each of the gaming units 10, etc. The network computer 42*a* may be a server computer and may be used to perform the same or different functions in relation to the gaming units 10*a* as the network computer 42 described above.

Although each network 41, 44 is shown to include one network computer 42, 42*a* and four gaming units 10, 10*a*, it should be understood that different numbers of computers and gaming units may be utilized. For example, the network 41 may include a plurality of network computers 42 and tens or hundreds of gaming units 10, all of which may be interconnected via the data link 43. The data link 43 may provided as a dedicated hardwired link or a wireless link. Although the data link 43 is shown as a single data link 43, the data link 43 may comprise multiple data links.

Gaming Unit Electronics

FIG. 6 is a block diagram of a number of components that may be incorporated in the gaming unit 10. Referring to FIG. 6, the gaming unit 10 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 6 illustrates that the control panel 18, the coin acceptor 12, the bill acceptor 13, the card reader 15 and the ticket reader/printer 14 may be operatively coupled to the I/O circuit 108, each of those components being so coupled by either a unidirectional or bidirectional, single-line or multiple-line data link, which may depend on the design of the component that is used. The emitter(s) 21 may be operatively coupled to a sound circuit which may comprise an amplifier 31 and ultrasonic audio processor 32. The processor 32 may be coupled to the I/O circuit 108.

As shown in FIG. 6, the components 12–15, 21 and 31 may be connected to the I/O circuit 108 via a respective direct line or conductor. Different connection schemes could be used. For example, one or more of the components shown in FIG. 6 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 10 (and one or more of the gaming units 10*a*) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 10, and may control the operation of the gaming unit 10 from a remote location. Such remote control may be facilitated with the use of a wireless connection, or by an Internet interface that connects the gaming unit 10 with a remote computer (such as one of the network computers 42, 42*a*) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 7:
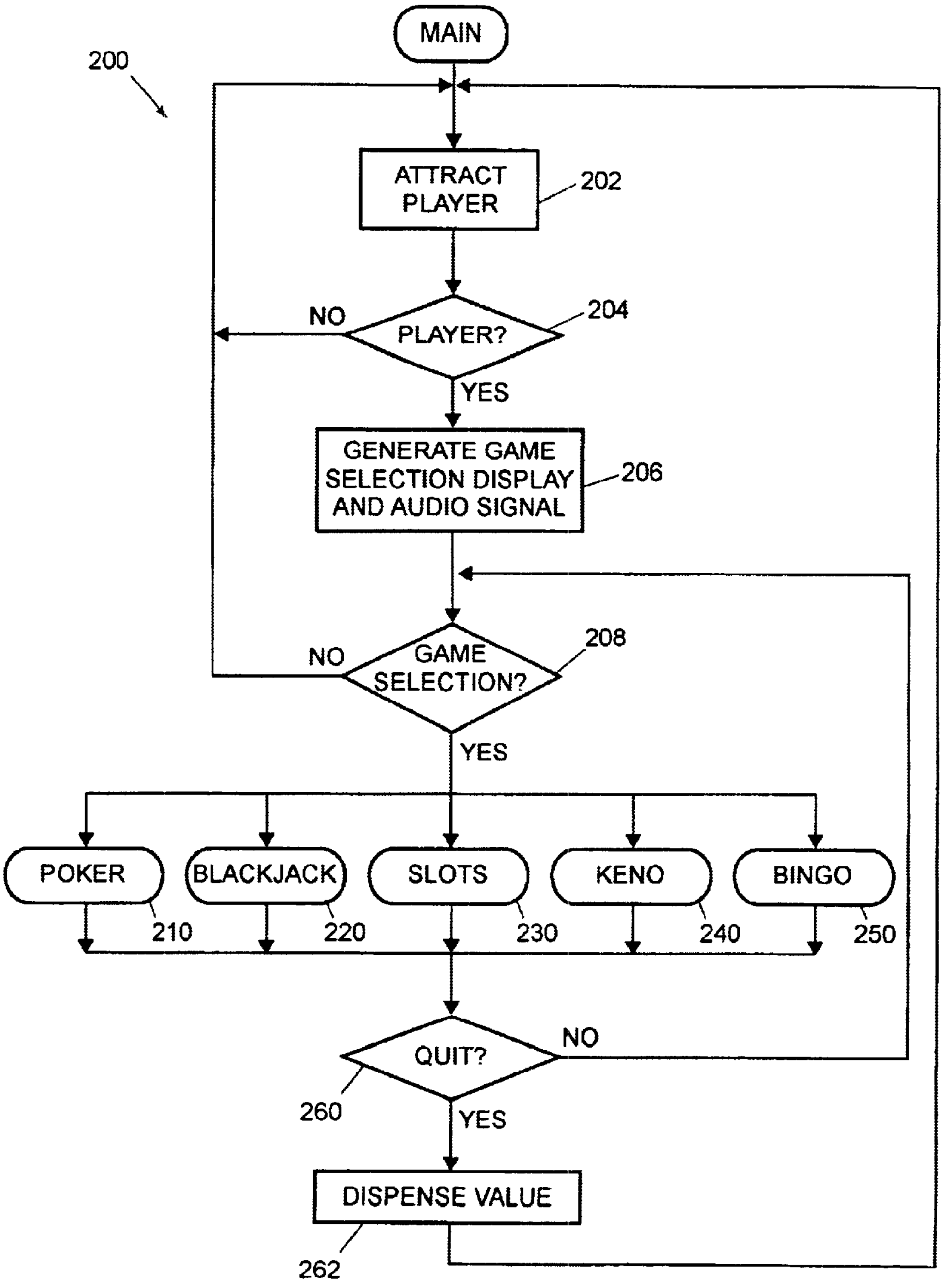
FIG. 7 is a flowchart of an embodiment of a main routine that may be performed during operation of one or more of the gaming units.

FIG. 7 is a flowchart of a main operating routine 200 that may be stored in the memory of the controller 100. Referring to FIG. 7, the main routine 200 may begin operation at block 202 during which an attraction sequence may be performed in an attempt to induce a potential player in a casino to play the gaming unit 10. The attraction sequence may be performed by displaying one or more video images on the display unit 19 and/or causing one or more ultrasonic sound segments, such as voice or music, to be emitted via the emitter 21. The attraction sequence may include a scrolling list of games that may be played on the gaming unit 10 and/or video images of various games being played, such as video poker, video blackjack, video slots, video keno, video bingo, etc.

During performance of the attraction sequence, if a potential player makes any input to the gaming unit 10 as determined at block 204, the attraction sequence may be terminated and a game-selection display may be generated on the display unit 19 at block 206 to allow the player to select a game available on the gaming unit 10. The gaming unit 10 may detect an input at block 204 in various ways. For example, the gaming unit 10 could detect if the player presses any button on the gaming unit 10; the gaming unit 10 could determine if the player deposited one or more coins into the gaming unit 10; the gaming unit 10 could determine if player deposited paper currency into the gaming unit; etc.

The game-selection display generated at block 206 may include, for example, a list of video games that may be played on the gaming unit 10 and/or a combination of audio and visual messages to prompt the player to deposit value into the gaming unit 10. While the game-selection display is generated, the gaming unit 10 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 10 or to select another game. If the player wishes to stop playing the gaming unit 10, which wish may be expressed, for example, by selecting a "Cash Out" button 34, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 7, a different number of routines could be included to allow play of a different number of games. The gaming unit 10 may also be programmed to allow play of different games.

Figure 8:
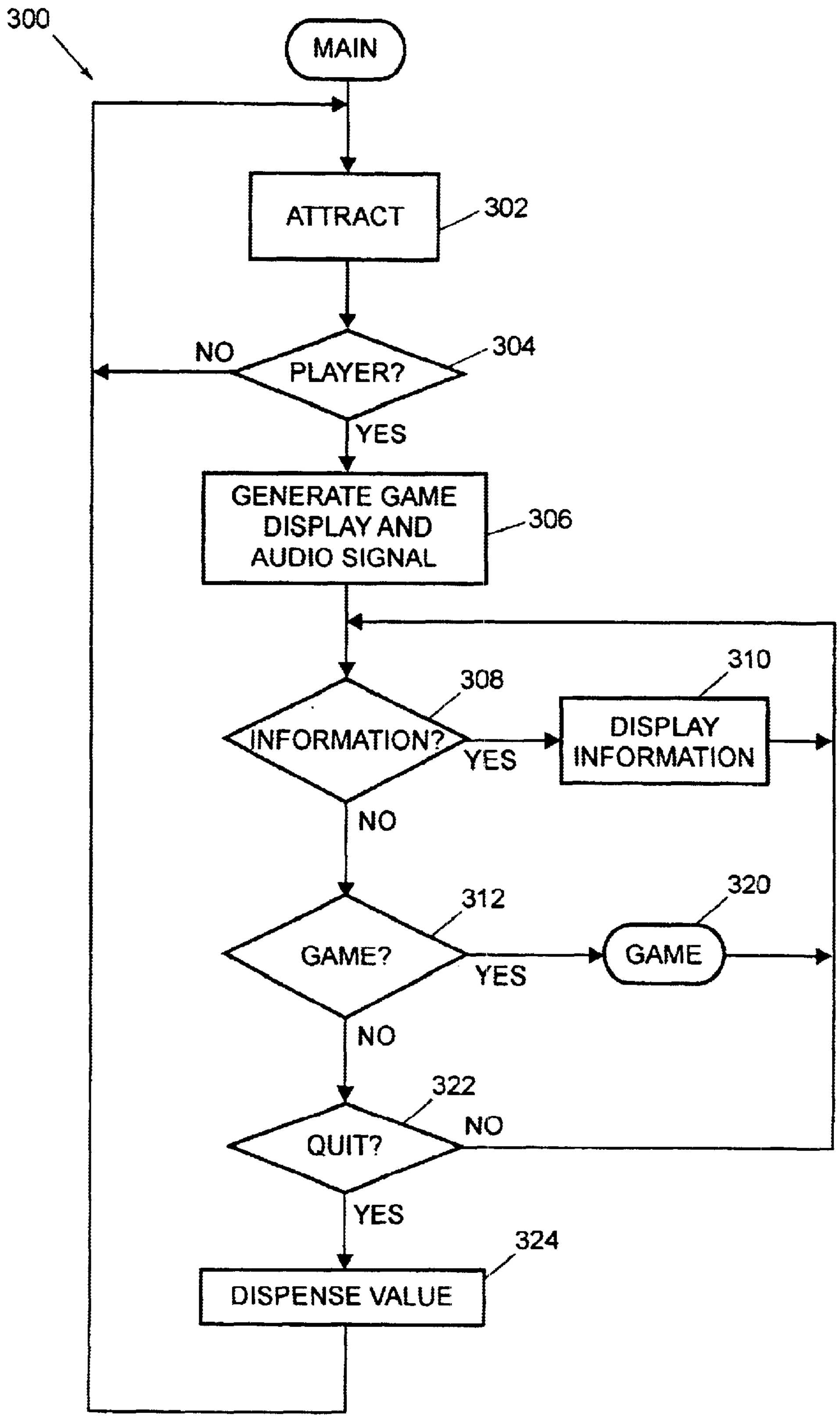
FIG. 8 is a flowchart of an alternative embodiment of a main routine that may be performed during operation of one or more of the gaming units.

FIG. 8 is a flowchart of an alternative main operating routine 300 that may be stored in the memory of the controller 100. The main routine 300 may be utilized for gaming units 10 that are designed to allow play of only a single game or single type of game. Referring to FIG. 8, the main routine 300 may begin operation at block 302 during which an attraction sequence may be performed in an attempt to induce a potential player in a casino to play the gaming unit 10. The attraction sequence may be performed by displaying one or more video images on the display unit 19 and/or causing one or more ultrasonic segments to be emitted via the emitter 21.

During performance of the attraction sequence, if a potential player makes any input to the gaming unit 10 as determined at block 304, the attraction sequence may be terminated and a game display and audio signal may be generated on the display unit 19 at block 306. The game display generated at block 306 may include, for example, an image of the casino game that may be played on the gaming unit 10 and/or a combination of audio and visual messages to prompt the player to deposit value into the gaming unit 10. At block 308, the gaming unit 10 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 10. If the player wishes to stop playing the gaming unit 10, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 9:
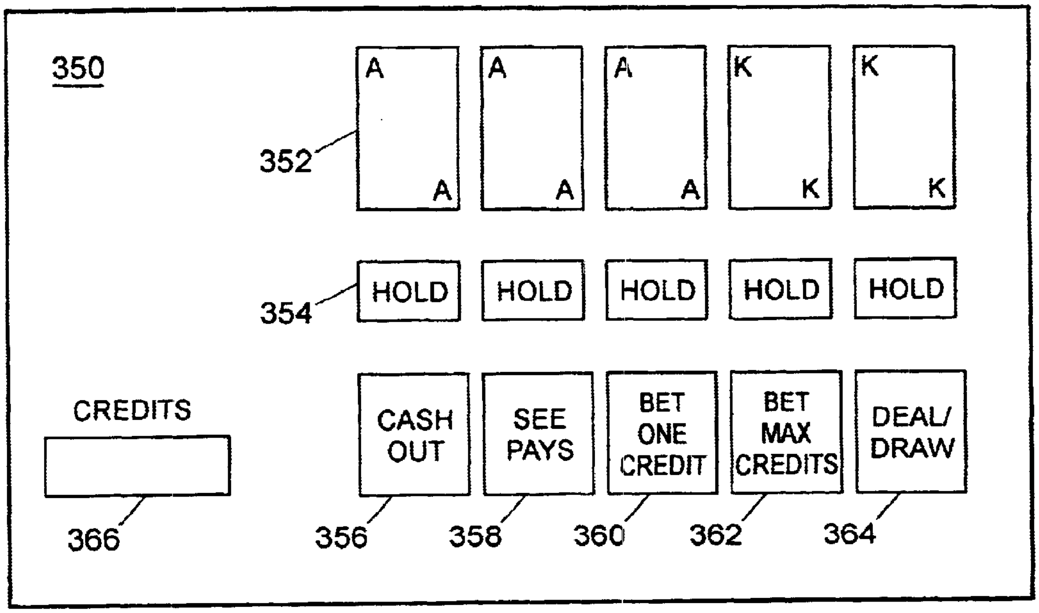
FIG. 9 is an illustration of an embodiment of a visual display that may be displayed during performance of the video poker routine of FIG. 11.

FIG. 9 is an exemplary display 350 that may be shown on the display unit 19 during performance of the video poker routine 210 shown schematically in FIG. 7. Referring to FIG. 9, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 19 is provided with a touch-sensitive screen, the buttons 354, 356, 358, 360, 362, 364 may form part of the video display 350. Alternatively, one or more of those buttons may be provided as part of a control panel that is provided separately from the display unit 19.

Figure 11:
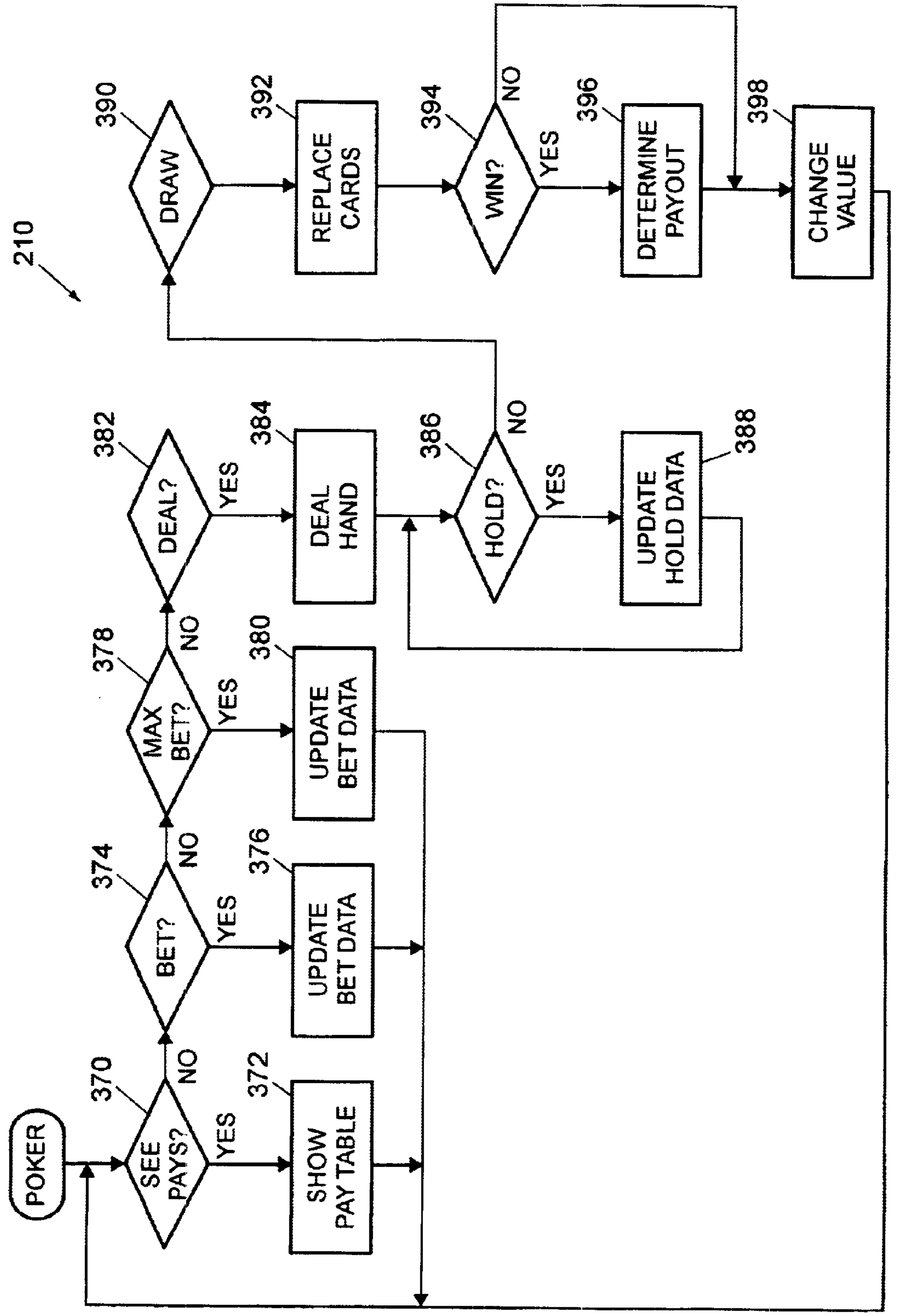
FIG. 11 is a flowchart of an embodiment of a video poker routine that may be performed by one or more of the gaming units.

FIG. 11 is a flowchart of the video poker routine 210 shown schematically in FIG. 7. Referring to FIG. 11, at block 370, the routine may determine whether the player has requested payout information, such as by activating the "See Pays" button 358, in which case at block 372 the routine may cause one or more pay tables to be displayed on the display unit 19. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 19 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 9).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 10:
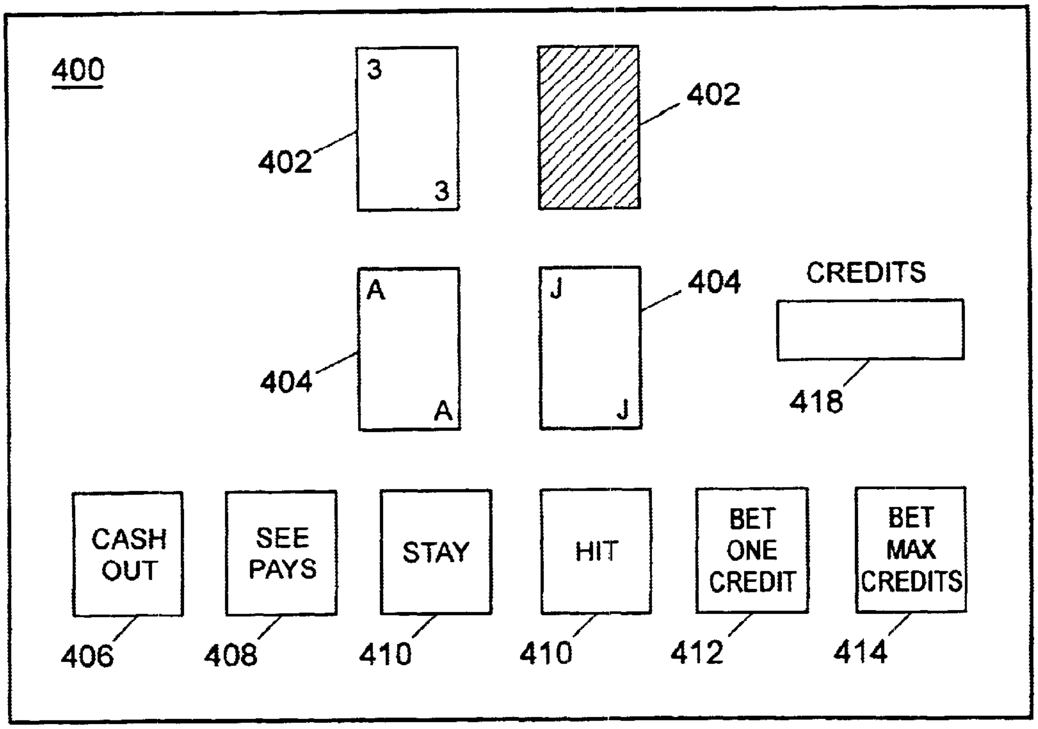
FIG. 10 is an illustration of an embodiment of a visual display that may be displayed during performance of the video blackjack routine of FIG. 12.

FIG. 10 is an exemplary display 400 that may be shown on the display unit 19 during performance of the video blackjack routine 220 shown schematically in FIG. 7. Referring to FIG. 10, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 10.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 19 is provided with a touch-sensitive screen, the buttons 406, 408, 410, 412, 414, 416 may form part of the video display 400. Alternatively, one or more of those buttons may be provided as part of a control panel that is provided separately from the display unit 19.

Figure 12:
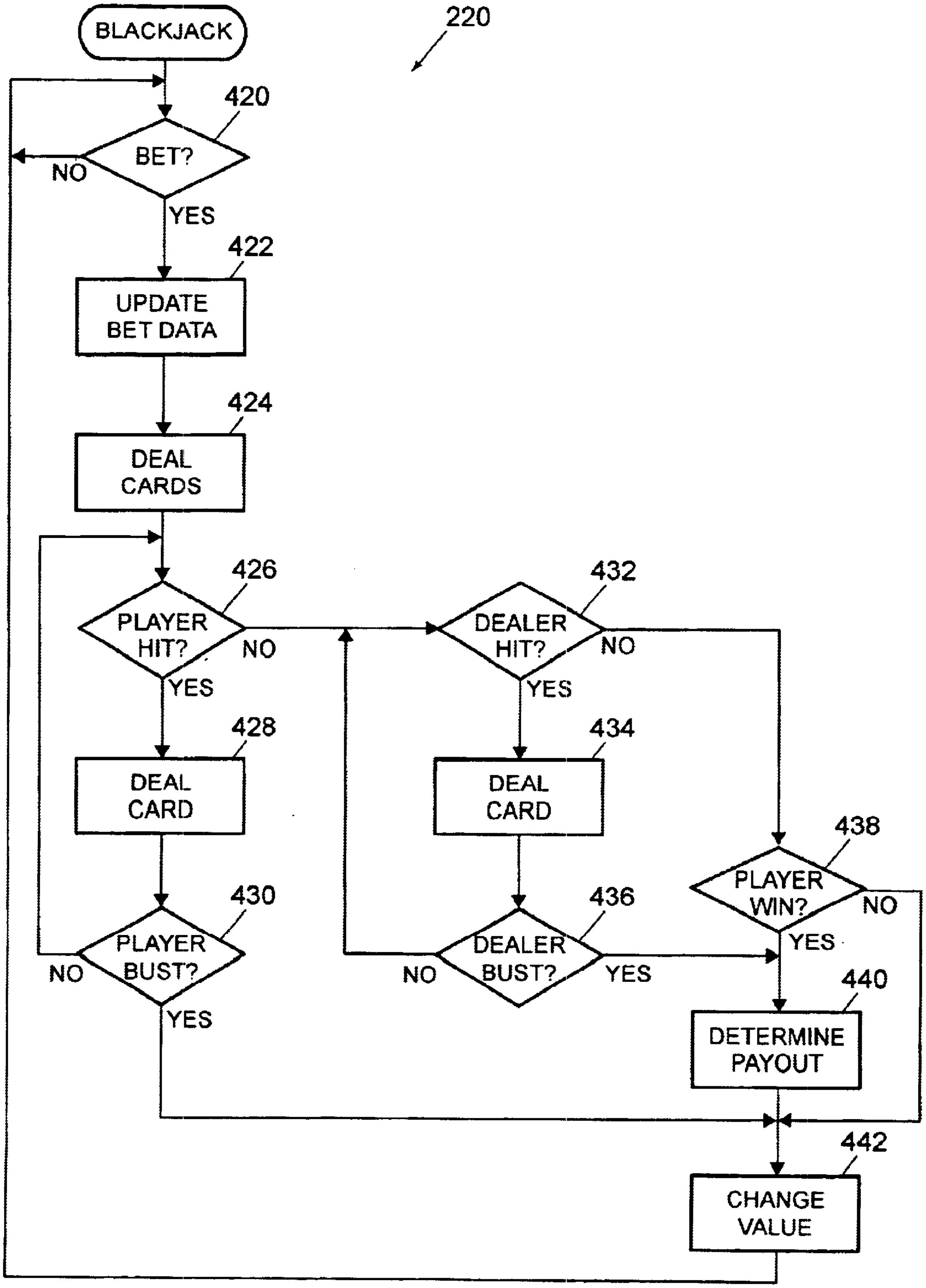
FIG. 12 is a flowchart of an embodiment of a video blackjack routine that may be performed by one or more of the gaming units.

FIG. 12 is a flowchart of the video blackjack routine 220 shown schematically in FIG. 10. Referring to FIG. 12, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 19.

At block 426, the player may be allowed to be "hit," in which case at block 428 another card will be dealt to the player's hand by making another playing card image 404 appear in the display 400. If the player is hit, block 430 may determine if the player has "bust," or exceeded twenty-one. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals fifteen or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed twenty-one. If the player has a winning hand, a payout value corresponding to the winning hand may be determined at block 440. At block 442, the player's cumulative value or number of credits may be updated by subtracting the bet made by the player and adding, if the player won, the payout value determined at block 396. The cumulative value or number of credits may also be displayed in the display area 418 with an accompanying audio signal directed at the player (FIG. 10).

Slots

Figure 13:
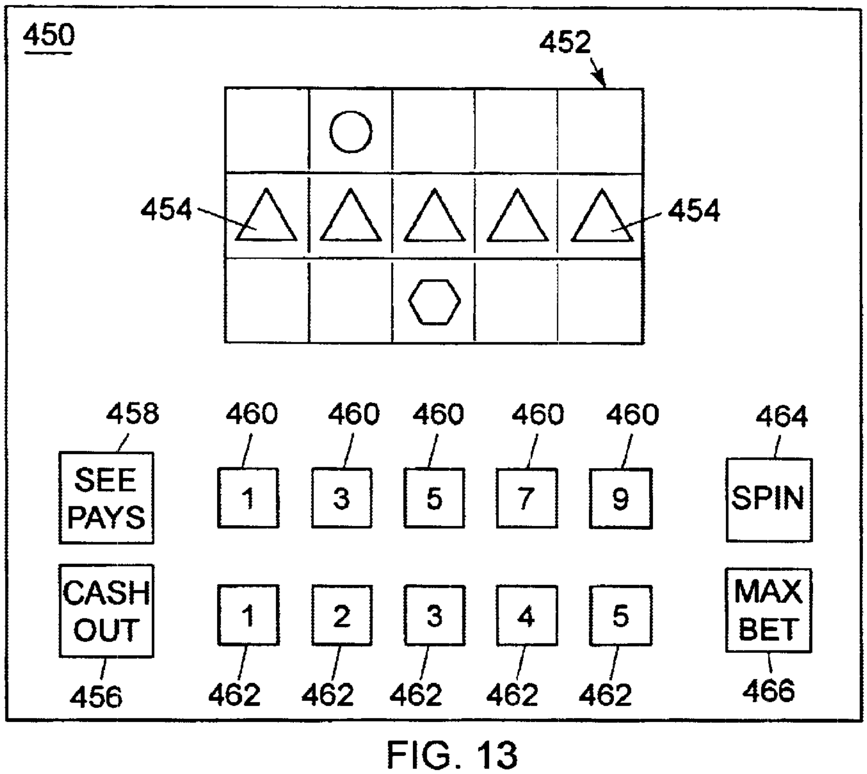
FIG. 13 is an illustration of an embodiment of a visual display that may be displayed during performance of the slots routine of FIG. 15.

FIG. 13 is an exemplary display 450 that may be shown on the display unit 19 during performance of the slots routine 230 shown schematically in FIG. 7. Referring to FIG. 13, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 15:
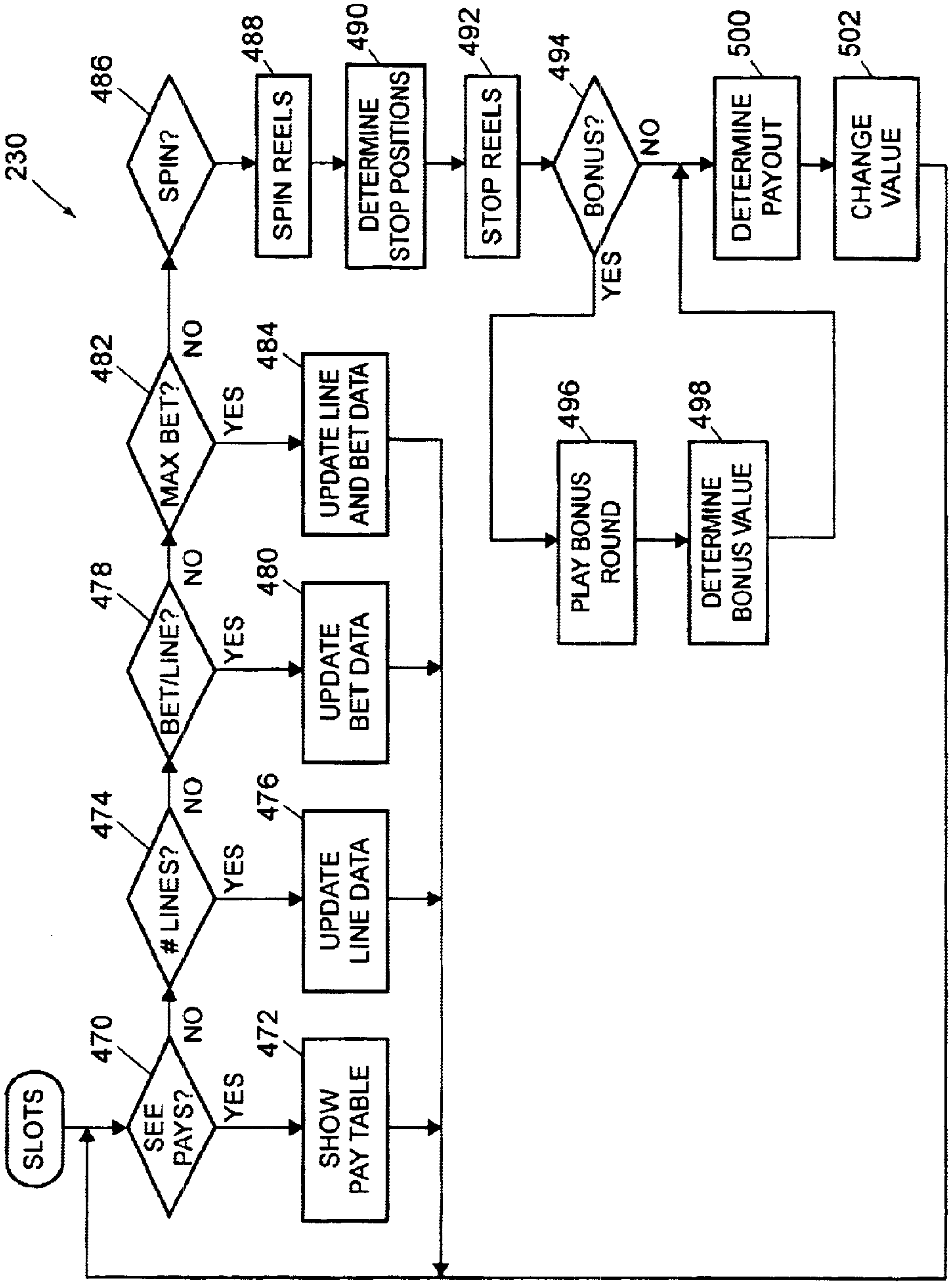
FIG. 15 is a flowchart of an embodiment of a slots routine that may be performed by one or more of the gaming units.

FIG. 15 is a flowchart of the slots routine 230 shown schematically in FIG. 7. Referring to FIG. 15, at block 470, the routine may determine whether the player has requested payout information, such as by activating the "See Pays" button 458, in which case at block 472 the routine may cause one or more pay tables to be displayed on the display unit 19. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 19, actual slot machine reels that are capable of being spun may be utilized instead.

Video Keno

Figure 14:
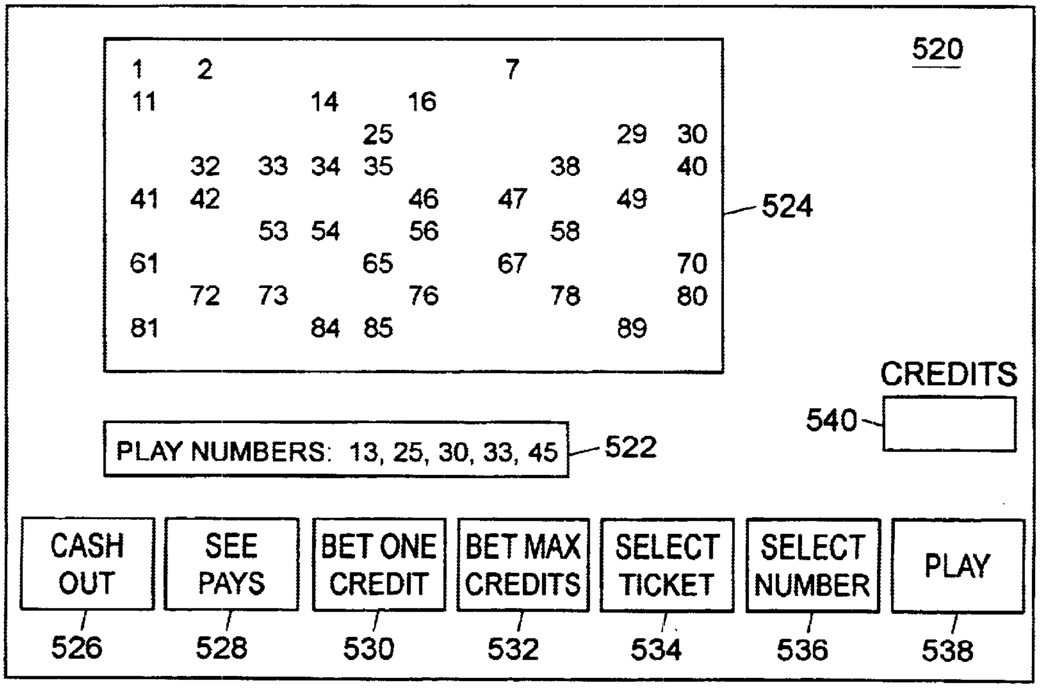
FIG. 14 is an illustration of an embodiment of a visual display that may be displayed during performance of the video keno routine of FIG. 16.

FIG. 14 is an exemplary display 520 that may be shown on the display unit 19 during performance of the video keno routine 240 shown schematically in FIG. 7. Referring to FIG. 14, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 19 is provided with a touch-sensitive screen, the buttons may form part of the video display 520. Alternatively, one or more of those buttons may be provided as part of a control panel that is provided separately from the display unit 19.

Figure 16:
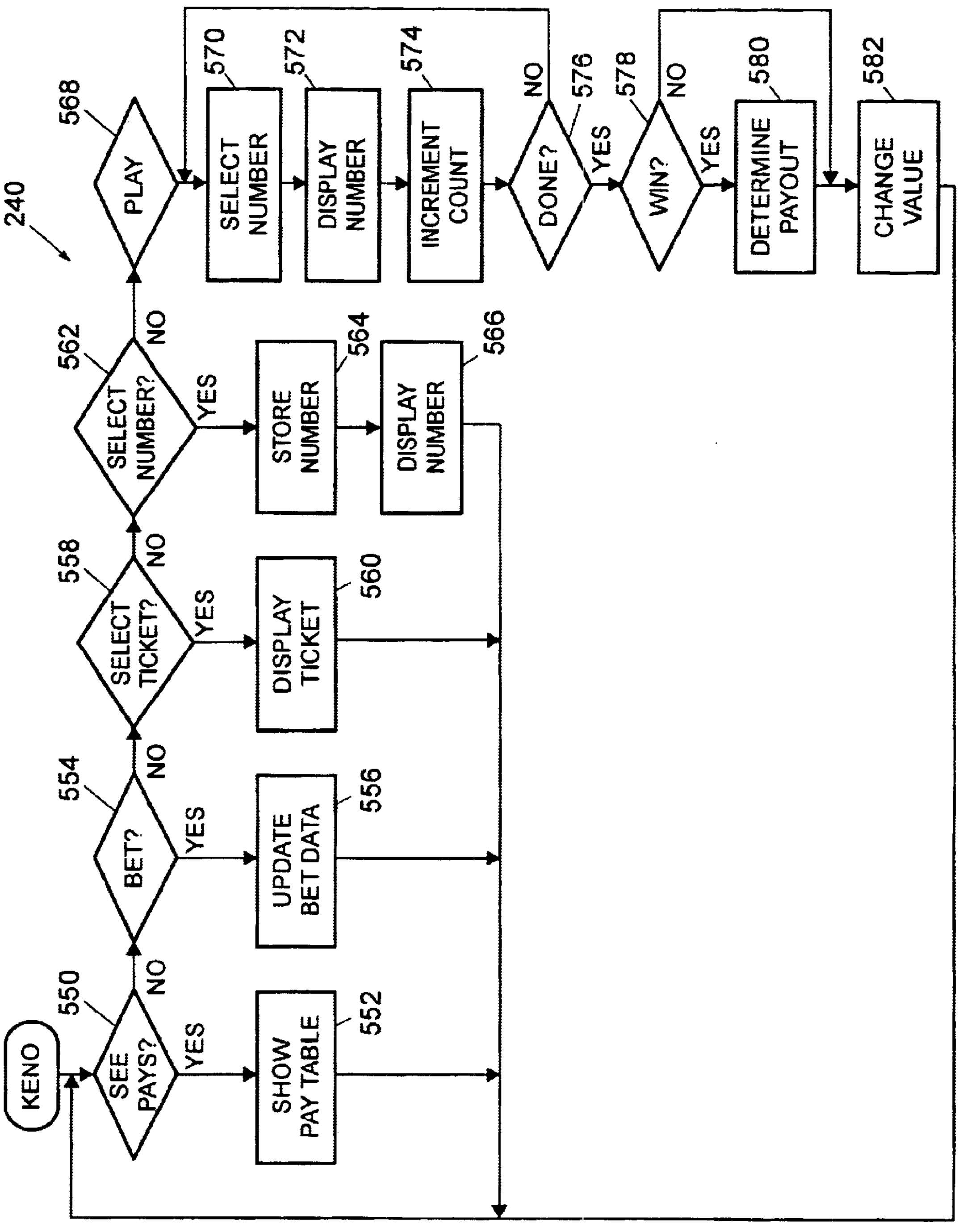
FIG. 16 is a flowchart of an embodiment of a video keno routine that may be performed by one or more of the gaming units.

FIG. 16 is a flowchart of the video keno routine 240 shown schematically in FIG. 7. The keno routine 240 may be utilized in connection with a single gaming unit 10 where a single player is playing a keno game, or the keno routine 240 may be utilized in connection with multiple gaming units 10 where multiple players are playing a single keno game. In the latter case, one or more of the acts described below may be performed either by the controller 100 in each gaming unit or by one of the network computer 42, 42*a* to which multiple gaming units 10 are operatively connected.

Referring to FIG. 16, at block 550, the routine may determine whether the player has requested payout information, such as by activating the "See Pays" button 528, in which case at block 552 the routine may cause one or more pay tables to be displayed on the display unit 19. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gaming units 10).

If play of the keno game is to begin as determined at block 568, at block 570 a game number within a range set by the casino may be randomly selected either by the controller 100 or a central computer operatively connected to the controller, such as one of the network computers 42, 42*a*. At block 572, the randomly selected game number may be displayed on the display unit 19 and the display units 19 of other gaming units 10 (if any) which are involved in the same keno game. At block 574, the controller 100 (or the central computer noted above) may increment a count which keeps track of how many game numbers have been selected at block 570.

At block 576, the controller 100 (or one of the network computers 42, 42*a*) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 14).

Video Bingo

Figure 17:
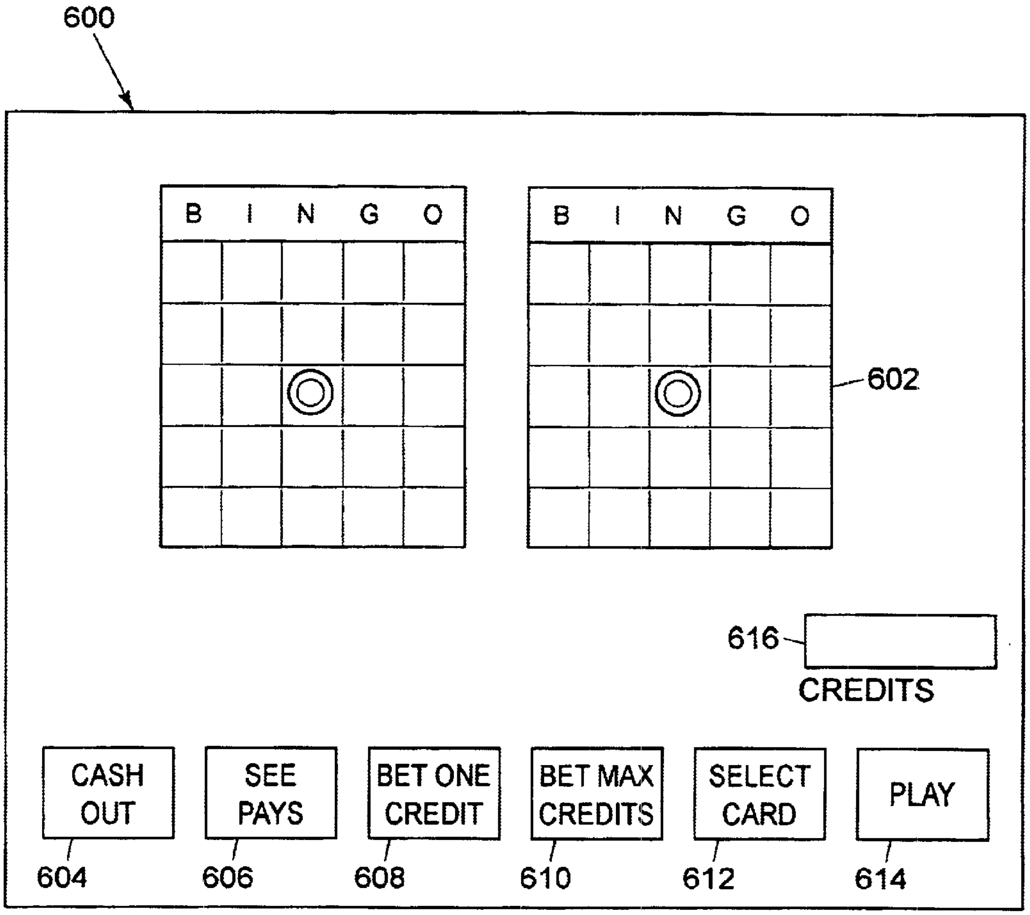
FIG. 17 is an illustration of an embodiment of a visual display that may be displayed during performance of the video bingo routine of FIG. 18.

FIG. 17 is an exemplary display 600 that may be shown on the display unit 19 during performance of the video bingo routine 250 shown schematically in FIG. 7. Referring to FIG. 17, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 19 is provided with a touch-sensitive screen, the buttons may form part of the video display 600. Alternatively, one or more of those buttons may be provided as part of a control panel that is provided separately from the display unit 19.

Figure 18:
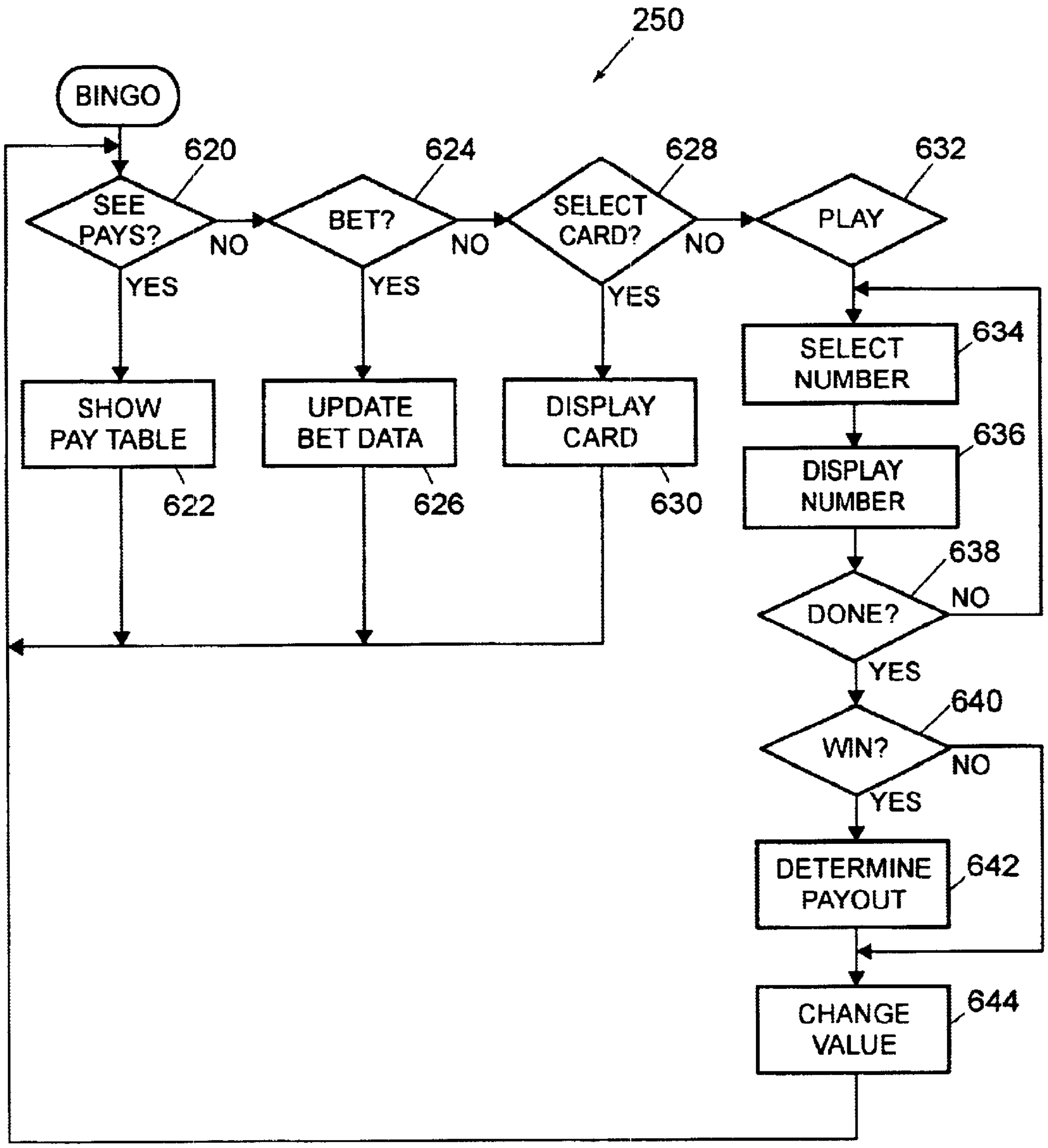
FIG. 18 is a flowchart of an embodiment of a video bingo routine that may be performed by one or more of the gaming units.

FIG. 18 is a flowchart of the video bingo routine 250 shown schematically in FIG. 7. The bingo routine 250 may be utilized in connection with a single gaming unit 10 where a single player is playing a bingo game, or the bingo routine 250 may be utilized in connection with multiple gaming units 10 where multiple players are playing a single bingo game. In the latter case, one or more of the acts described below may be performed either by the controller 100 in each gaming unit 10 or by one of the network computers 42, 42*a* to which multiple gaming units 10 are operatively connected.

Referring to FIG. 18, at block 620, the routine may determine whether the player has requested payout information, such as by activating the "See Pays" button 606, in which case at block 622 the routine may cause one or more pay tables to be displayed on the display unit 19. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 42, 42*a*. At block 636, the bingo number may be displayed on the display unit 19 and the display units 19 of any other gaming units 10 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 10 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 17).

Numerous modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A gaming apparatus, comprising:

a controller programmed to generate an audio signal, said controller being operatively linked to an ultrasonic audio processor, said ultrasonic audio processor programmed to convert said audio signal received from said controller into an ultrasonic signal, said ultrasonic audio processor being operatively linked to an ultrasonic emitter, said ultrasonic emitter emitting the ultrasonic signal along a predetermined column of air, said ultrasonic signal being demodulated into audible sounds along the column by interaction of said ultrasonic signal with said air.

2. A gaming apparatus as defined in claim 1 wherein said column is vertical and has a width of less than or about four feet.

3. A gaming apparatus as defined in claim 1 wherein said column of air is disposed in front of the gaming apparatus.

4. A gaming apparatus as defined in claim 1 wherein said gaming apparatus comprises a top surface, and wherein said emitter is mounted to said top surface.

5. A gaming apparatus as defined in claim 1 wherein said gaming apparatus comprises a front surface, and wherein said emitter is mounted to said front surface.

6. A gaming system comprising a plurality of gaming apparatuses as defined in claim 1, said gaming apparatuses being interconnected to form a network of gaming apparatuses.

7. A gaming system as defined in claim 6, wherein said gaming apparatuses are interconnected via the Internet.

8. A gaming apparatus as defined in claim 1, wherein said gaming apparatus further comprises:

a display unit that is capable of generating video images;

a value input device;

said controller operatively coupled to said display unit and said value input device, said controller being programmed to allow a person to make a wager, said controller being programmed to cause a video image to be generated on said display unit, said video image and said audio signal representing a game selected from the group of games consisting of video poker, video blackjack, video slots, video keno and video bingo, said audio signal comprising game instructions and an indication of an outcome of said game, said video image comprising an image of at least five playing cards if said game comprises video poker, said video image comprising an image of a plurality of simulated slot machine reels if said game comprises video slots, said video image comprising an image of a plurality of playing cards if said game comprises video blackjack, said video image comprising an image of a plurality of keno numbers if said game comprises video keno, said video image comprising an image of a bingo grid if said game comprises video bingo, said controller being programmed to determine the outcome of said game represented by said audio signal and said video image and a value payout associated with said outcome of said game.

9. A gaming apparatus as defined in claim 8 wherein said column is vertical and has a width of less than or about four feet.

10. A gaming apparatus as defined in claim 8 wherein said column is disposed in front of the gaming apparatus.

11. A gaming apparatus as defined in claim 8 wherein said gaming apparatus comprises a top surface, and wherein said emitter is mounted to said top surface.

12. A gaming apparatus as defined in claim 8 wherein said gaming apparatus comprises a front surface, and wherein said emitter is mounted to said front surface.

13. A gaining system comprising a plurality of gaming apparatuses as defined in claim 8, said gaming apparatuses being interconnected to form a network of gaming apparatuses.

14. A gaming system as defined in claim 13, wherein said gaming apparatuses are interconnected via the Internet.

15. A gaming apparatus as defined in claim 1, wherein said gaming apparatus further comprises:

a display unit that is capable of generating video images;

a value input device;

said controller operatively coupled to said display unit and said value input device, said controller being programmed to allow a person to make a wager;

said controller being programmed to cause a video image to be generated on said display unit, said video image and said audio signal representing a casino game, said controller being programmed to determine, after said video image has been displayed and after said audio signal has been sent to the ultrasonic audio processor, an outcome of said casino game represented by said video image and said audio signal and to determine a value payout associated with said outcome of said casino game.

16. A gaming apparatus as defined in claim 15 wherein said column is vertical and has a width of less than or about four feet.

17. A gaming apparatus as defined in claim 15 wherein said column of air is disposed in front of the gaming apparatus.

18. A gaming apparatus as defined in claim 15 wherein said gaming apparatus comprises a top surface, and wherein said emitter is mounted to said top surface.

19. A gaming apparatus as defined in claim 15 wherein said gaming apparatus comprises a front surface, and wherein said emitter is mounted to said front surface.

20. A gaming system comprising a plurality of gaming apparatuses as defined in claim 15, said gaming apparatuses being interconnected to form a network of gaming apparatuses.

21. A gaming system as defined in claim 20, wherein said gaming apparatuses are interconnected via the Internet.

22. A gaming apparatus, comprising:

a display unit that is capable of generating video images;

a value input device;

an ultrasonic audio processor programmed to convert audio signals into ultrasonic signals, said ultrasonic audio processor being operatively linked to an ultrasonic emitter, said ultrasonic emitter capable of emitting ultrasonic signals along a predetermined column of air, said ultrasonic signals being demodulated into audible sounds along the column by interaction of said ultrasonic signals with air, a controller operatively coupled to said display unit, said value input device and said ultrasonic audio processor, said controller being programmed to allow a person to make a wager, said controller being programmed to allow a person to make a payline selection, said controller being programmed to cause a video image to be generated on said display unit and to send an audio signal to the ultrasonic audio processor, said video image comprising a plurality of simulated slot machine reels of a slots game, each of said slot machine reels having a plurality of slot machine symbols, said audio signal simulating rotating slot machine reels and further comprising instructions and a declaration of the outcome of said slots game, said controller being programmed to determine an outcome of said slots game represented by said video image, audio signal and a value payout associated with said outcome of said slots game, said controller being programmed to determine said outcome of said slots game based on a configuration of said slot machine symbols.

23. A gaming apparatus as defined in claim 22 wherein said column is vertical and has a width of less than or about four feet.

24. A gaming apparatus as defined in claim 22 wherein said column of air is disposed in front of the gaming apparatus.

25. A gaming apparatus as defined in claim 22 wherein said gaming apparatus comprises a top surface, and wherein said emitter is mounted to said top surface.

26. A gaming apparatus as defined in claim 22 wherein said gaming apparatus comprises a front surface, and wherein said emitter is mounted to said front surface.

27. A gaming system comprising a plurality of gaming apparatuses as defined in claim 22, said gaming apparatuses being interconnected to form a network of gaming apparatuses.

28. A gaming system as defined in claim 27, wherein said gaming apparatuses are interconnected via the Internet.

29. A gaming method comprising:

causing a video game image and an audio signal to be generated, said video game image and said audio signal representing a game selected from the group of games consisting of video poker, video blackjack, video slots, video keno and video bingo, said audio signal comprising game instructions and an indication of an outcome of said game, said video game image comprising an image of at least five playing cards if said game comprises video poker, said video game image comprising an image of a plurality of simulated slot machine reels if said game comprises video slots, said video game image comprising an image of a plurality of playing cards if said game comprises video blackjack, said video game image comprising an image of a plurality of keno numbers if said game comprises video keno, and said video game image comprising an image of a bingo grid if said game comprises video bingo;

determining an outcome of said game represented by said video game images;

determining a value payout associated with said outcome of said game;

converting said audio signal to an ultrasonic signal;

emitting said ultrasonic signal along a predetermined column of air adjacent said video image; and demodulating said ultrasonic signal in said column with said air to produce audible sounds within said column.

* * * * *